United States Patent
Sommers

(10) Patent No.: US 11,386,111 B1
(45) Date of Patent: Jul. 12, 2022

(54) SYSTEMS, DEVICES, AND METHODS FOR DATA ANALYTICS

(71) Applicant: MASSACHUSETTS MUTUAL LIFE INSURANCE COMPANY, Springfield, MA (US)

(72) Inventor: Timothy Sommers, Springfield, MA (US)

(73) Assignee: MASSACHUSETTS MUTUAL LIFE INSURANCE COMPANY, Springfield, MA (US)

( * ) Notice: Subject to any disclaimer, the term of this patent is extended or adjusted under 35 U.S.C. 154(b) by 339 days.

(21) Appl. No.: 16/788,161

(22) Filed: Feb. 11, 2020

(51) Int. Cl.
*G06F 9/54* (2006.01)
*G06F 16/25* (2019.01)
*H04L 67/10* (2022.01)

(52) U.S. Cl.
CPC ............ *G06F 16/254* (2019.01); *G06F 9/546* (2013.01); *H04L 67/10* (2013.01)

(58) Field of Classification Search
CPC ......... G06F 16/254; G06F 9/546; H04L 67/10
See application file for complete search history.

(56) References Cited

U.S. PATENT DOCUMENTS

| | | | | |
|---|---|---|---|---|
| 7,024,431 B1 * | 4/2006 | Kornelson | ............ | G06F 16/258 |
| 9,325,344 B2 * | 4/2016 | Beier | ...................... | H03M 7/46 |
| 9,449,038 B2 * | 9/2016 | Gupta | ................. | G06F 11/1446 |
| 2002/0161778 A1 * | 10/2002 | Linstedt | ................ | G06F 16/254 |
| | | | | 707/999.102 |
| 2005/0234969 A1 * | 10/2005 | Mamou | ................. | G06Q 10/10 |
| | | | | 707/999.102 |
| 2022/0043806 A1 * | 2/2022 | Crabtree | ................. | G06F 9/485 |

OTHER PUBLICATIONS

Golov et al., Big Data Normalization for Massively Parallel Processing Databases, 2015, Springer International Publishing Switzerland, pp. 154-163 (Year: 2015).*
Bani et al., Implementation of Database Massively Parallel Processing System to Build Scalability on Process Data Warehouse, 2018, Elsevier Ltd., pp. 68-79 (Year: 2018).*

* cited by examiner

*Primary Examiner* — Jorge A Casanova
(74) *Attorney, Agent, or Firm* — Foley & Lardner LLP

(57) ABSTRACT

Various systems and methods use a value in a data file for a data process, as the data process is scaled up in terms of dataset dimensionality, data volume, data types, data content, data source quantity, and data source speed, while remaining compliant with ACID principles. As such, these technologies provide for sourcing of data from various data sources, where the data includes the data file storing the value. The data is cleansed and fused, which enables a report to be generated. In response to the value in the data file being modified, the data, inclusive of the data file storing the value, is again cleansed and fused based on the value being modified. This processing in-turn enables the report to modified based on the value being modified.

20 Claims, 3 Drawing Sheets

SYSTEMS, DEVICES, AND METHODS FOR DATA ANALYTICS

TECHNICAL FIELD

This disclosure generally relates to systems and methods for data analytics.

BACKGROUND

A data file (e.g., spreadsheet, portable document format (PDF) file, text file, delimited file, flat file) can store a numerical value in a machine-readable format. As such, the numerical value can be copied based on the machine-readable format and then inserted into a data process (e.g., business intelligence algorithm, analytic algorithm) for generating a result based on the numerical value.

If the numerical value is updated in the data file and the data process is not updated based on the numerical value as updated, then the result may be stale. Although the data process can be programmed to monitor the numerical value in the data file in real-time, this form of monitoring becomes logically complex and computationally intensive as the data process is scaled up in terms of data dimensionality, data volume, data types, data content, data source quantity, and data source speed. For example, if the numerical value conflicts in format, type, or content with other data used by the data process, then, as the data process is scaled up, such conflict can be logically complex and computationally intensive to deal with, especially while to trying to remain compliant with atomicity, consistency, isolation, and durability (ACID) principles. Likewise, if the data process is distributed over a network, then such configuration even further complicates data availability, data conflict management, and compliance with the ACID principles. Similarly, if the numerical value is hardcoded into the data process in order to avoid usage of the data file, then modifying the numerical value requires a set of specialized computer programming knowledge, which is often not readily available. Moreover, if the numerical value is hardcoded into the data process in a plurality of locations within the data process or if the numerical value depends on some source code internal or external to the data process or if some source code internal or external to the data process depends on the numerical value, then such configuration even further complicates data availability, data conflict management, and compliance with the ACID principles.

SUMMARY

Various systems and methods use a value in a data file for a data process, as the data process is scaled up in terms of dataset dimensionality, data volume, data types, data content, data source quantity, and data source speed, while remaining compliant with the ACID principles. As such, these technologies provide for sourcing of data from various data sources, where the data includes the data file storing the value. The data is cleansed and fused, which enables a report to be generated. Subsequently, in response to the value in the data file being modified, the data, inclusive of the data file storing the value, is again cleansed and fused based on the value being modified. This processing cascades and in-turn enables the report to be modified based on the value being modified, which can be in real-time. For example, because the value in the data file can be manually modified by a non-programmer, without being manually hardcoded into a software application by a programmer in various source code locations of the software application, the value in the data file can be manually modified when a change in the value is desired (e.g., based on external factors). Therefore, this form of modification can be less technical for non-programmers and more user friendly for non-programmers.

In an embodiment, a method comprises: sending, by a processor, a multidimensional dataset from a massively parallel processing (MPP) database of a first cloud computing platform (CCP) to an extract, transform, and load (ETL) application of a second CCP; sending, by the processor, a first set of datasets and a second set of datasets to the ETL application, wherein the first set of datasets is different from each other in format and content and is sourced from a set of data files external to the first CCP and the second CCP, wherein the set of data files includes a spreadsheet with a cell value, wherein the second set of datasets is sourced from a set of schematically different databases external to the first CCP and the second CCP; performing, by the processor, a data cleanse on the multidimensional dataset, the first set of datasets inclusive of the cell value, and the second set of datasets within the ETL application such that a cleansed dataset is generated within the ETL application; performing, by the processor, a data fusion on the cleansed dataset within the ETL application such that a fused dataset is generated within the ETL application; populating, by the processor, a MPP column-oriented database with the fused dataset sourced from the ETL application; generating, by the processor, a report based on the fused dataset sourced from the MPP column-oriented database; modifying, by the processor, the cell value in the spreadsheet after the report is generated without modifying the first set of datasets and the second set of datasets; updating, by the processor, the fused dataset in the MPP column-oriented database in real-time based on the cell value being modified; and updating, by the processor, the report in real-time based on the fused dataset in the MPP column-oriented database being updated.

In an embodiment, a system comprises: a processor programmed to: send a multidimensional dataset from a massively parallel processing (MPP) database of a first cloud computing platform (CCP) to an extract, transform, and load (ETL) application of a second CCP; send a first set of datasets and a second set of datasets to the ETL application, wherein the first set of datasets is different from each other in format and content and is sourced from a set of data files external to the first CCP and the second CCP, wherein the set of data files includes a spreadsheet with a cell value, wherein the second set of datasets is sourced from a set of schematically different databases external to the first CCP and the second CCP; perform a data cleanse on the multi-dimensional dataset, the first set of datasets inclusive of the cell value, and the second set of datasets within the ETL application such that a cleansed dataset is generated within the ETL application; perform a data fusion on the cleansed dataset within the ETL application such that a fused dataset is generated within the ETL application; populate a MPP column-oriented database with the fused dataset sourced from the ETL application; generate a report based on the fused dataset sourced from the MPP column-oriented database; modify the cell value in the spreadsheet after the report is generated without modifying the first set of datasets and the second set of datasets; update the fused dataset in the MPP column-oriented database in real-time based on the cell value being modified; and update the report in real-time based on the fused dataset in the MPP column-oriented database being updated.

DETAILED DESCRIPTION

This disclosure enables various technologies for using a value in a data file for a data process, as the data process is scaled up in terms of dataset dimensionality, data volume, data types, data content, data source quantity, and data source speed, while remaining compliant with the ACID principles. As such, these technologies provide for sourcing of data from various data sources, where the data includes the data file storing the value. The data is cleansed and fused, which enables a report to be generated. Subsequently, in response to the value in the data file being modified, the data, inclusive of the data file storing the value, is again cleansed and fused based on the value being modified. This processing cascades and in-turn enables the report to be modified based on the value being modified, which can be in real-time. For example, since the value in the data file can be manually modified by a non-programmer, without being manually hardcoded into a software application by a programmer in various source code locations of the software application, the value in the data file can be manually modified when a change in the value is desired (e.g., based on external factors). Therefore, this form of modification can be less technical for non-programmers and more user friendly for non-programmers.

Figure 1:
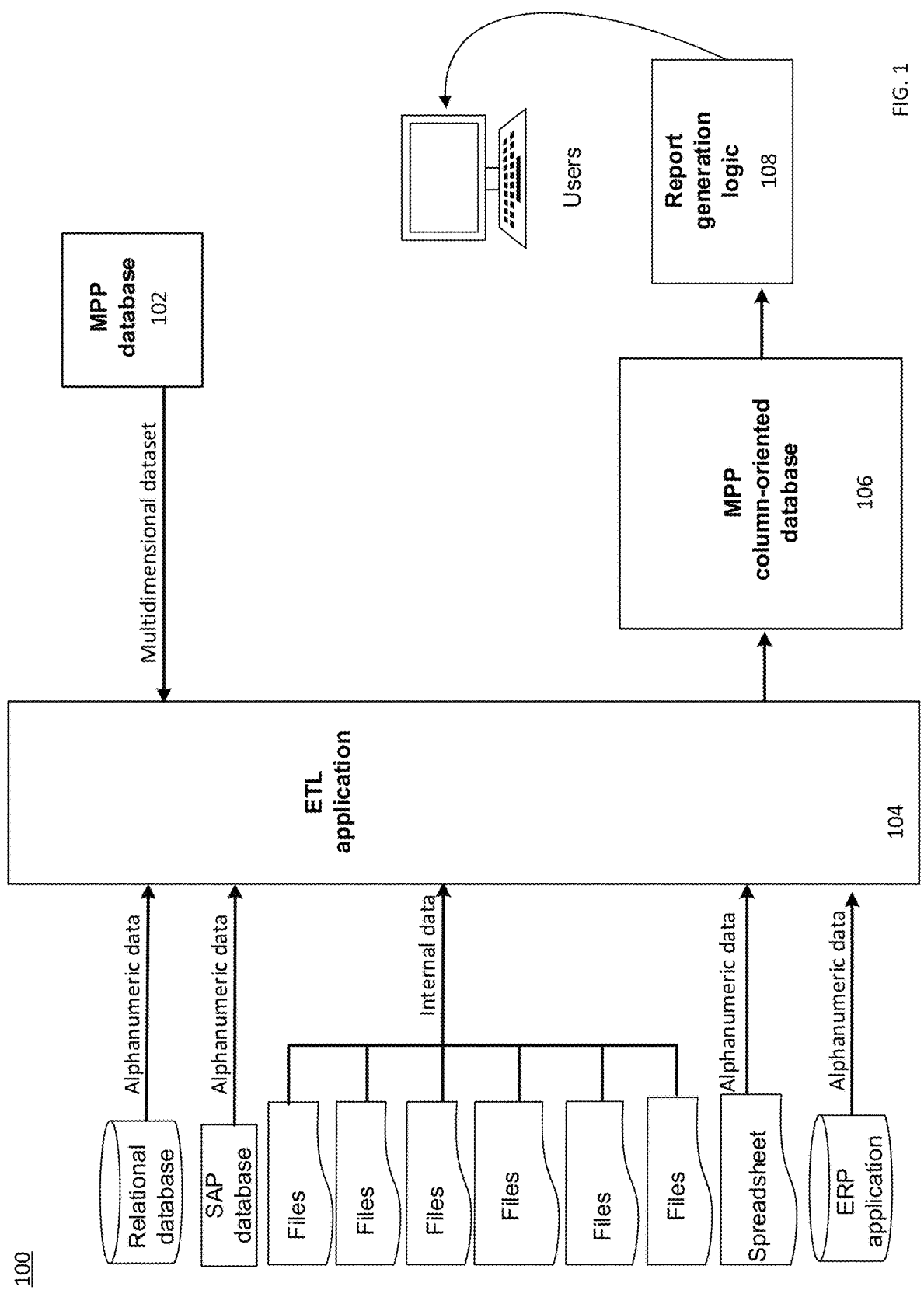
FIG. 1 shows a network diagram, according to an embodiment.
Figure 2:
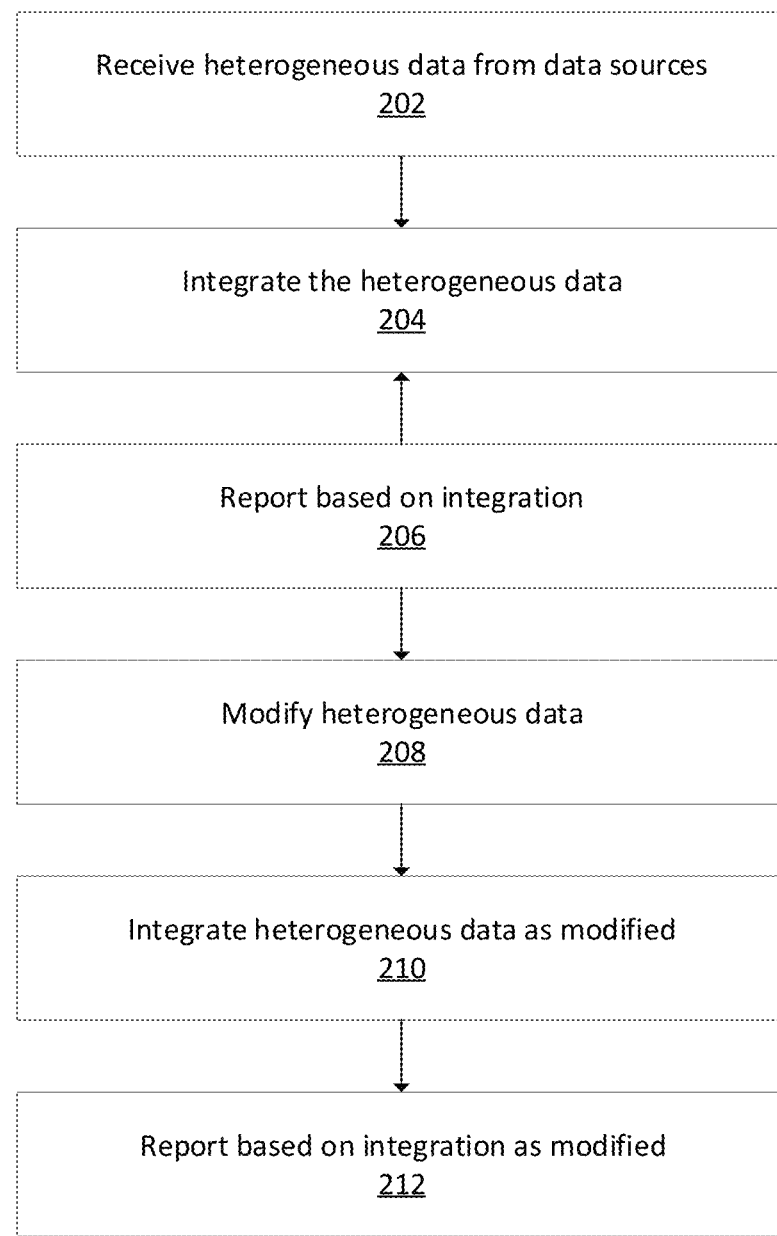
FIG. 2 shows a flowchart, according to an embodiment.
Figure 3:
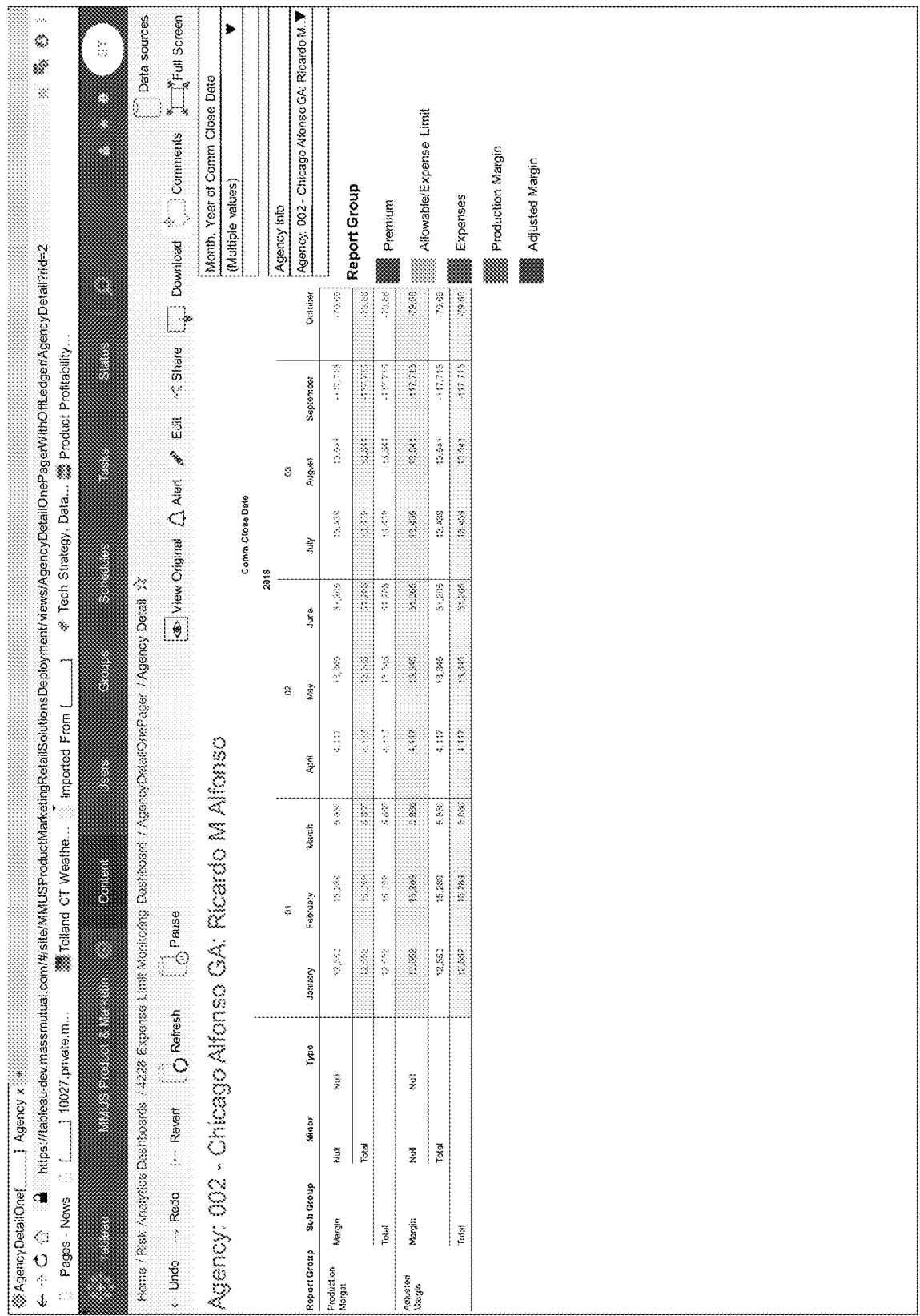
FIG. 3 shows a report that is cascade-updated in real-time, according to an embodiment.

This disclosure is now described more fully with reference to FIGS. 1-3, in which some embodiments of this disclosure are shown. This disclosure may, however, be embodied in many different forms and should not be construed as necessarily being limited to the embodiments disclosed herein. Rather, these embodiments are provided so that this disclosure is thorough and complete, and fully conveys various concepts of this disclosure to skilled artisans.

FIG. 1 shows an embodiment of a network diagram according to this disclosure. In particular, a network diagram 100 includes an enterprise data warehouse (EDW) 102 of a first data center of a first CCP operated by a first entity (e.g., Teradata). The network diagram 100 further includes an ETL application 104 of a second data center of a second CCP operated by a second entity (e.g., Alteryx). The ETL application 104 can host a transformation layer (e.g., dedicated logic, run-pause engine) therein. For example, the transformation layer can include an enterprise content management system logic (e.g., Adobe Experience Manager). The network diagram 100 additionally includes a massively parallel processing (MPP) column-oriented database (CODB) 106 of a third data center of a third CCP operated by a third entity (e.g., Amazon). An MPP database is configured to handle multiple operations simultaneously by a plurality of processing units, each processing unit having its own operating system and memory. The network diagram 100 also includes a data visualization application 108 of a fourth data center of a fourth CCP operated by a fourth entity (e.g., Tableau). Note that at least two of the EDW 102, the ETL application 104, the MPP CODB 106, or the data visualization application 108 can share a data center or a CCP or be operated by a common entity in any permutational manner. For example, the ETL application 104 and the data visualization application 108 can be a single application, which can be operated by a single entity.

The EDW 102 can be a Teradata (or another type) enterprise warehouse that supports a parallel, shared-nothing architecture, which can include hybrid storage (e.g., frequently used hot data is stored on high-performance solid state drives while less frequently used cold data is placed on traditional hard disk drives) or multigenerational coexistence (e.g. fabric backbone). As such, the EDW 102 hosts an MPP database that stores a set of records populated (e.g. real-time, on-demand) from a set of data sources (e.g. cloud or on-premise data files, databases, data warehouses, data lakes, data stores, data hubs, data marts, flat files, delimited files, logs, applications, spreadsheets, file-sharing services). The set of records and the set of data sources are not associated with the first CCP. The MPP database can generate or formulate a multidimensional dataset from the set of records within the first CCP. For example, the MPP database can employ an online analytical processing (OLAP) cube to generate the multidimensional dataset, where the OLAP cube can be user operated via a matrix interface, which performs projection operations along various dimensions. For example, as shown in FIG. 1, the multidimensional dataset can include premiums and commissions data, agent and agency demographics data, or other data.

The ETL application 104 can create a workflow (e.g., dragging tools onto canvas) that processes data (as explained herein) in a sequential order. The EDW 102 can send the multidimensional dataset from the MPP database to the ETL application 104. The multidimensional dataset is not associated with the first entity or the first CCP or the second entity or the second CCP. The ETL application 104 receives (or accesses) a first set of datasets and a second set of datasets, each being other than the multidimensional dataset. For example, the transformation layer can receive (or access) the first set of datasets or the second set of datasets.

The first set of datasets (e.g., raw, transformed) is sourced from a set of data files (e.g. spreadsheets, PDF forms, image files, sound files, video files, text files, delimited files, flat files). For example, as shown in FIG. 1, the set of data files can include haircut rates data file, allowable rates data file, BGLB rates data file, expense business mapping data file, RVP and FC list data file, Off Ledger spreadsheet, or other data files. The first set of datasets is not associated with the first CCP or the second CCP. The first set of datasets can be different from each other in format or content. The first set of datasets can be external to the first CCP or the second CCP. The set of data files includes a data file with a value (e.g. alphabetical value or string, numerical value or string, whole value or string, decimal value or string, fraction value or string). For example, the data file can be a spreadsheet having a worksheet with a set of cells at least one of which can include a numerical value (e.g. parameter value), which can be modified by a user computing device (e.g. physical keyboard, virtual keyboard, cursor device). For example, the user computing device has a write permission for the data file and for the value in the data file at least when modifying the value. The numerical value can be created via the user computing device (e.g. physical keyboard, virtual keyboard, cursor device) or via a data source (e.g. executable logic, application) writing the value to the data file.

The second set of datasets (e.g., raw, transformed) is sourced from a set of schematically different (e.g., physical schema, logical schema, view schema) databases (e.g. external to the first CCP or the second CCP. The second set of datasets is not associated with the first CCP and the second CCP. The set of data files is external to the set of schematically different databases. The set of schematically different databases can include a CODB at least partially sourcing the second set of datasets. For example, the CODB database can include commission override data that is sent over a network (e.g., local area, wide area, storage area) and renames in a separate folder, where data files can be put in subfolder with date attached. The set of schematically different databases can include a database (e.g. SAP HANA) that is in-memory, column-oriented, and relational that at least partially sources the second set of datasets. The set of schematically different databases can include an Enterprise Resource Planning (ERP) application (e.g. Sage X3) that at least partially sources the second set of datasets. The set of data files is not stored within the set of schematically different databases. Prior to the ETL application 104 receiving (or accessing) the first set of datasets and the second set of datasets, the ETL application 104 can read and analyze the multidimensional dataset received from MPP database and then responsively request that the first set of datasets be sourced or generated from the set of data files based on the multidimensional dataset or the second set of datasets be sourced or generated from the set of schematically different databases based on the multidimensional dataset. For example, as shown in FIG. 1, the set of schematically different databases can include CODB database, Respond Commissions database, SAP database, Sage X3 database, or other databases.

The ETL application 104 performs a data cleanse on the multidimensional dataset, the first set of datasets inclusive of the value from the data file, and the second set of datasets within the ETL application 104. For example, the transformation layer can perform the data cleanse. For example, the data cleanse can include identifying a cell within a worksheet of a spreadsheet of a data file based on a preset address of the cell (e.g., A4, GG23), reading the value within the cell, and acting, as described herein. For example, the data cleanse can include logically intertwining or interrelating the value from the cell with other data sourced from the multidimensional dataset, the first set of datasets, and the second set of datasets. The data cleanse can enable the multidimensional dataset, the first set of datasets inclusive of the value from the data file, and the second set of datasets to be consistent (e.g. format, type, content) with each other. For example, the data cleanse can include detecting and then correcting (or removing) corrupt or inaccurate data, which can be from batches of data. For example, the data cleanse can include identifying incomplete, incorrect, inaccurate or irrelevant data parts and then replacing, modifying, or deleting dirty or coarse data, which can be from batches of data. For example, the data cleanse can include data wrangling, data enhancement, data harmonization, or others.

The ETL application 104 performs a data fusion (e.g. low, intermediate, high) on the multidimensional dataset, the first set of datasets inclusive of the value from the data file, and the second set of datasets within the ETL application 104 after the data cleanse. For example, the transformation layer can perform the data fusion. The data fusion can include integrating the multidimensional dataset, the first set of datasets inclusive of the value from the data file, and the second set of datasets to produce more consistent, accurate, and useful information than that provided by any of these data alone. For example, the data fusion can include data integration which can combine heterogeneous data (the multidimensional dataset, the first set of datasets inclusive of the value from the data file, and the second set of datasets) from different sources, which can include resolving semantic conflicts (e.g., schema defining ontologies), and providing a unified data organization therefor (e.g., unified schema). For example, the data fusion can include an organized dataset (e.g., raw data, transformed data) formed based on the multidimensional dataset, the first set of datasets inclusive of the value from the data file, and the second set of datasets. For example, the data fusion can include logically intertwining or interrelating the value from the cell with other data sourced from the multidimensional dataset, the first set of datasets, and the second set of datasets, as data cleansed.

The ETL application 104 populates the MPP CODB 106 with the multidimensional dataset, the first set of datasets inclusive of the value from the data file, and the second set of datasets from the ETL application after the data fusion. For example, the transformation layer can populate the MPP CODB 106. For example, the MPP CODB 106 can be analytic database (e.g., Vertica) or can include (a) a query language interface with many analytics capabilities built-in (e.g., time series gap filling/interpolation, event-based windowing and sessionization, pattern matching, event series joins, statistical computation, regression analysis, geospatial analysis), (b) in-database machine learning including categorization, fitting and prediction to enhance processing speed by eliminating down-sampling and data movement, (c) high compression due to columns of homogeneous datatype being stored together and because updates to main store are batched, (d) shared-nothing architecture, which reduces system contention for shared resources and allows gradual degradation of performance in the face of hardware failure, or other functions. For example, the ETL application 104 populates the MPP CODB 106 to include the organized dataset formed based on the multidimensional dataset, the first set of datasets inclusive of the value from the data file, and the second set of datasets. The MPP database 102 and the MPP CODB 106 can be schematically different (e.g., physical schema, logical schema, view schema) from each other or different from each other in database type (e.g. relational and non-relational, primary storage and secondary storage, local and distributed).

After the MPP CODB 106 has been populated with the multidimensional dataset, the first set of datasets inclusive of the value from the data file, and the second set of datasets from the ETL application 104 after the data fusion, then the data visualization application 108 can generate a visual report based on the multidimensional dataset, the first set of datasets inclusive of the value from the data file, and the second set of datasets sourced from the MPP CODB 106. For example, the data visualization application 108 can include an engine that is programmed to generate the visual report, where the engine can be started, stopped, paused, or running, and the report is generated when the engine is running. For example, the visual report can be based on transformed data sourced from an organized dataset formed based on the multidimensional dataset, the first set of datasets inclusive of the value from the data file, and the second set of datasets. The data visualization application 108 can generate (e.g., real-time, on-demand) the visual report as requested by the user computing device (e.g. physical keyboard, virtual keyboard, cursor device) or by an executable logic (e.g. local application, remote application). The visual report can be presented in a browser of the user computing device or within a non-browser application of the user computing device. For example, the visual report can be presented in the browser, can be downloadable as a data file, or can be dynamically updateable based on a specified time period as manually input (e.g. physical keyboard, virtual keyboard, cursor device).

The value of the data file sourced from the set of data files can be modified after the visual report is generated, including when or after the visual report is served for end user display. This modification can occur by the user computing device (e.g. physical keyboard, virtual keyboard, cursor device) or by an executable logic (e.g. local application, remote application). For example, if the data file is a spreadsheet containing a cell value, then the cell value can be modified. If the cell value is logically related or intertwined with other data, whether raw or formatted, sourced from the multidimensional dataset, the first set of datasets inclusive of the value from the data file, or the second set of datasets, then this processing can ensure that the visual report is not based on stale information when dealing with large scale computing in terms data dimensionality, data volume, data types, data content, data source quantity, and data source speed. Further, such processing can minimizing handling complex or computationally intensive data conflicts, while remaining compliant with the ACID principles, especially over if such data processing is network-distributed. Additionally, such processing can avoid specialized computer programming knowledge and avoid hardcoding the cell value into such data processing, especially in several locations if the cell value is used or read several times throughout such data processing.

Once this modification occurs, which can be after the value as modified is saved in the data file, then the ETL application 104 performs the data cleanse again on the multidimensional dataset, the first set of datasets inclusive of the value from the data file as modified, and the second set of datasets within the ETL application 104. For example, the transformation layer can perform the data cleanse. For example, the data cleanse again can include identifying a cell, same as during the data cleanse before, within a worksheet of a spreadsheet of a data file based on a preset address of the cell (e.g., A4, GG23), reading the value within the cell as modified, and acting, as described herein. The data cleanse can be performed again on the multidimensional dataset, the first set of datasets inclusive of the value from the data file as modified, and the second set of datasets within the ETL application in real-time response to the value from the data file being modified after the visual report is generated.

Likewise, the ETL application 104 performs the data fusion again on the multidimensional dataset, the first set of datasets inclusive of the value from the data file as modified, and the second set of datasets within the ETL application 104 after the data cleanse is completed with the value from the data file being modified. For example, the transformation layer can perform the data fusion. The data fusion can be performed again on the multidimensional dataset, the first set of datasets inclusive of the value from the data file as modified, and the second set of datasets within the ETL application 104 after the data cleanse is completed with the value from the data file being modified in real-time response to the data cleanse being performed after the visual report is generated. Then, the ETL application 104 updates the MPP CODB 106 based on the data fusion based on the value from the data file being modified. The MPP CODB 106 can be updated in real-time based on the data fusion with the value from the data file being modified in real-time response to the data cleanse being performed after the visual report is generated. Similarly, the data visualization application 108 updates the visual report based on the MPP CODB 106 being updated (e.g. notification of update, real-time database monitoring, periodic database monitoring). The visual report can be updated in real-time based on the MPP CODB 106 being updated in real-time in real-time response to the data cleanse being performed after the visual report is generated.

Note that the data visualization application 108 can generate the visual report automatically and email to a user or a predefined group of users on a predefined date/time. Likewise, the data visualization application 108 can be programmed to performed a trending analysis upon update, as explained above.

FIG. 2 shows an embodiment of a flowchart according to this disclosure. In particular, a flowchart 200 includes a set of blocks 202-212, which can be performed by a configuration shown in the network diagram 100.

In block 202, a processor(s) receives heterogeneous data from data sources. For example, the ETL application 104 receives the multidimensional dataset from the MPP database, the first set of datasets from set of data files and the second set of datasets from set of schematically different databases, as explained above. The first set of datasets is different from each other in format and content. The set of data files includes the file (e.g., spreadsheet) with the value.

In block 204, the processor(s) integrates the heterogeneous data. For example, the heterogeneous data can be integrated within the ETL application 104 via the data cleanse and the data fusion, as explained above. Then, the heterogeneous data can be written to the MPP CODB 106, as explained above.

In block 206, the processor(s) reports based on integration. For example, the data visualization application 108 can generate the visual report using the MPP CODB 106 based on integration, as explained above.

In block 208, the processor(s) modifies the heterogeneous data. For example, the value within the spreadsheet can be modified after the visual report is generated, as explained above.

In block 210, the processor(s) integrates heterogeneous data as modified. For example, the ETL application 104 performs the data cleanse and the data fusion again on the multidimensional dataset, the first set of datasets inclusive of the value from the data file as modified, and the second set of datasets within the ETL application 104, as explained above.

In block 212, the processor(s) reports based on integration as modified. For example, the ETL application 104 updates the MPP CODB 108 based on the data fusion with the value from the data file being modified and the data visualization application 108 updates the visual report based on the MPP column-oriented database 106 being updated.

FIG. 3 shows an embodiment of a report that is cascade updated in real-time according to this disclosure. In particular, a report 300 is presented in a tabular form having a plurality of data fields populated with a plurality of numeric values. At least some of the values are cascade updated in real-time responsive to a value contained in a cell of a spreadsheet being updated, as described herein.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

The terminology used herein is for describing particular example embodiments and is not intended to be necessarily limiting of the present disclosure. As used herein, the singular forms "a," "an" and "the" are intended to include the plural forms as well, unless the context clearly indicates otherwise. Also, as used herein, the term "a" and/or "an" shall mean "one or more," even though the phrase "one or more" is also used herein. The terms "comprises," "includes" and/or "comprising," "including" when used in this specification, specify the presence of stated features, integers, steps, operations, elements, and/or components, but do not preclude the presence and/or addition of one or more other features, integers, steps, operations, elements, components, and/or groups thereof. Furthermore, when the present disclosure states herein that something is "based on" something else, then such statement refers to a basis which may be based on one or more other things as well. In other words, unless expressly indicated otherwise, as used herein "based on" inclusively means "based at least in part on" or "based at least partially on."

As used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from the teachings of the present disclosure.

Furthermore, relative terms such as "below," "lower," "above," and "upper" can be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings were turned over, then the elements described as being on the "lower" side of other elements would then be oriented on "upper" sides of the other elements. Similarly, if the device in one of the figures were turned over, elements described as "below" or "beneath" other elements would then be oriented "above" the other elements. Therefore, the example terms "below" and "lower" can encompass both an orientation of above and below.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Although preferred embodiments have been depicted and described in detail herein, those skilled in the relevant art will appreciate that various modifications, additions, substitutions and the like can be made without departing from the spirit of the disclosure, and these are, therefore, considered to be within the scope of the disclosure, as defined in the following claims.

What is claimed is:

1. A method comprising:
sending, by a processor, a multidimensional dataset from a massively parallel processing (MPP) database of a first cloud computing platform (CCP) to an extract, transform, and load (ETL) application of a second CCP;
sending, by the processor, a first set of datasets and a second set of datasets to the ETL application, wherein the first set of datasets is different from each other in format and content and is sourced from a set of data files external to the first CCP and the second CCP, wherein the set of data files includes a spreadsheet with a cell value, wherein the second set of datasets is sourced from a set of schematically different databases external to the first CCP and the second CCP;
performing, by the processor, a data cleanse on the multidimensional dataset, the first set of datasets inclusive of the cell value, and the second set of datasets within the ETL application such that a cleansed dataset is generated within the ETL application;
performing, by the processor, a data fusion on the cleansed dataset within the ETL application such that a fused dataset is generated within the ETL application;
populating, by the processor, a MPP column-oriented database with the fused dataset sourced from the ETL application;
generating, by the processor, a report based on the fused dataset sourced from the MPP column-oriented database;
modifying, by the processor, the cell value in the spreadsheet after the report is generated without modifying the first set of datasets and the second set of datasets;
updating, by the processor, the fused dataset in the MPP column-oriented database in real-time based on the cell value being modified; and
updating, by the processor, the report in real-time based on the fused dataset in the MPP column-oriented database being updated.

2. The method of claim 1, wherein the set of schematically different databases includes a CODB at least partially sourcing the second set of datasets.

3. The method of claim 1, wherein the set of schematically different databases includes a database that is in-memory, column-oriented, and relational that at least partially sources the second set of datasets.

4. The method of claim 1, wherein the set of schematically different databases includes an ERP application that at least partially sources the second set of datasets.

5. The method of claim 1, wherein the first set of datasets and the second set of datasets are generated based on the first multidimensional dataset.

6. The method of claim 1, wherein the report is presented in a browser, is downloadable as a file, and is dynamically updateable based on a specified time period as manually input.

7. The method of claim 1, wherein the MPP database stores a set of records populated from a set of data sources external to the MPP database, wherein the set of records and the set of data sources are not associated with the first CCP, wherein the multidimensional dataset is generated from the set of records within the first CCP.

8. The method of claim 1, wherein the multidimensional dataset is not associated with the first CCP and the second CCP.

9. The method of claim 1, wherein the first set of datasets is not associated with the first CCP and the second CCP.

10. The method of claim 1, wherein the set of data files is not stored within the set of schematically different databases.

11. The method of claim 1, wherein the second set of datasets is not associated with the first CCP and the second CCP.

12. The method of claim 1, wherein the MPP column-oriented database is hosted within a third CCP different from the first CCP and the second CCP.

13. The method of claim 1, wherein the set of data files is external to the set of schematically different databases.

14. The method of claim 1, wherein the MPP database and the MPP column-oriented database are schematically different from each other.

15. The method of claim 1, wherein the MPP database and the MPP column-oriented database are different from each other in database type.

16. The method of claim 1, wherein the fused dataset is updated in the MPP column-oriented database in real-time based on the data cleanse being performed on the multidimensional dataset, the first set of datasets inclusive of the cell value as modified, and the second set of datasets within the ETL application after the report is generated and in real-time response to the cell value being modified after the report is generated.

17. The method of claim 16, wherein the fused dataset is updated in the MPP column-oriented database in real-time based on the data fusion being performed on the multidimensional dataset, the first set of datasets inclusive of the cell value as modified, and the second set of datasets within the ETL application after the report is generated and in real-time response to the data cleanse being performed after the report is generated.

18. A system comprising:
a processor programmed to:
    send a multidimensional dataset from a massively parallel processing (MPP) database of a first cloud computing platform (CCP) to an extract, transform, and load (ETL) application of a second CCP;
    send a first set of datasets and a second set of datasets to the ETL application, wherein the first set of datasets is different from each other in format and content and is sourced from a set of data files external to the first CCP and the second CCP, wherein the set of data files includes a spreadsheet with a cell value, wherein the second set of datasets is sourced from a set of schematically different databases external to the first CCP and the second CCP;
    perform a data cleanse on the multidimensional dataset, the first set of datasets inclusive of the cell value, and the second set of datasets within the ETL application such that a cleansed dataset is generated within the ETL application;
    perform a data fusion on the cleansed dataset within the ETL application such that a fused dataset is generated within the ETL application;
    populate a MPP column-oriented database with the fused dataset sourced from the ETL application;
    generate a report based on the fused dataset sourced from the MPP column-oriented database;
    modify the cell value in the spreadsheet after the report is generated without modifying the first set of datasets and the second set of datasets;
    update the fused dataset in the MPP column-oriented database in real-time based on the cell value being modified; and
    update the report in real-time based on the fused dataset in the MPP column-oriented database being updated.

19. The system of claim 18, wherein the fused dataset is updated in the MPP column-oriented database in real-time based on the data cleanse being performed on the multidimensional dataset, the first set of datasets inclusive of the cell value as modified, and the second set of datasets within the ETL application after the report is generated and in real-time response to the cell value being modified after the report is generated.

20. The system of claim 19, wherein the fused dataset is updated in the MPP column-oriented database in real-time based on the data fusion being performed on the multidimensional dataset, the first set of datasets inclusive of the cell value as modified, and the second set of datasets within the ETL application after the report is generated and after the data cleanse and in real-time response to the data cleanse being performed after the report is generated, wherein the MPP column-oriented database is hosted within a third CCP different from the first CCP and the second CCP, wherein the MPP database and the MPP column-oriented database are schematically different from each other, wherein the MPP database and the MPP column-oriented database are different from each other in database type.

* * * * *